UNITED STATES PATENT OFFICE.

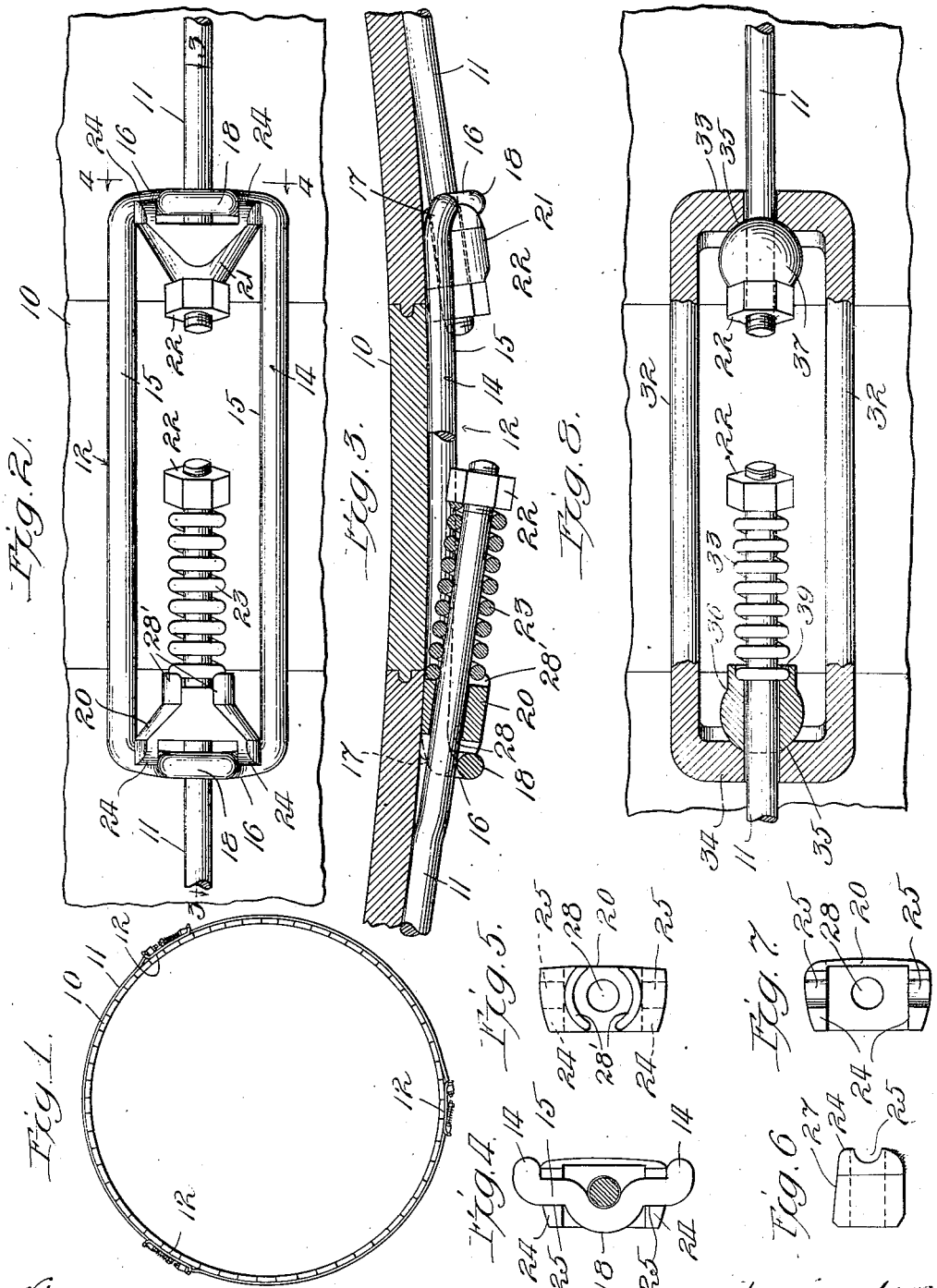

ANDREW RASMUSSEN, OF RACINE JUNCTION, WISCONSIN, ASSIGNOR TO PEERLESS SILO SUPPLY CO., OF RACINE, WISCONSIN, A CORPORATION OF WISCONSIN.

HOOP AND FASTENER FOR SILO AND LIKE TANKS.

1,104,134.     Specification of Letters Patent.     Patented July 21, 1914.

Application filed November 4, 1912. Serial No. 729,305.

*To all whom it may concern:*

Be it known that I, ANDREW RASMUSSEN, a citizen of the United States, and a resident of Racine Junction, in the county of Racine and State of Wisconsin, have invented certain new and useful Improvements in Hoops and Fasteners for Silo and like Tanks; and I do hereby declare that the following is a full, clear, and exact description thereof, reference being had to the accompanying drawings, and to the characters of reference marked thereon, which form a part of this specification.

This invention relates to improvements in hoops and tighteners or fasteners therefor for silos and like tanks or inclosures, the walls of which are made of wood staves and which are subject to periodic expansion and contraction that must be compensated for by spring members arranged in the hoops or hoop tighteners.

The invention consists in the matters hereinafter set forth and more particularly pointed out in the appended claims.

Among the objects of the invention is to provide a simple and efficient hoop and fastener having means to permit the walls of the inclosure to expand and contract, while adapted to hold the hoop closely about the varying diameter of the wall due to such expansion and contraction, the parts of the hoop and fasteners which have relative movement being, for this purpose, arranged to freely slide or move upon each other without tendency to bind.

In the drawings,—Figure 1 is a horizontal section of a tank equipped with my improved hoop and hoop fastener. Fig. 2 is an enlarged view of the ends of the hoop and one of the fasteners. Fig. 3 is a section on the line 3—3 of Fig. 2. Fig. 4 is a section on the line 4—4 of Fig. 2. Fig. 5 is an inner end elevation of one of the pivoted fittings to which the hoop end is attached. Fig. 6 is a side view of said fitting. Fig. 7 is an outer end elevation of said fitting. Fig. 8 is a view partly in side elevation and partly in section of a modified form of fastener.

As shown in the drawings, 10 designates the wall of the silo, tank or other inclosure, 11 the hoops which surround same and 12 designates as a whole the couplings or fastening members for drawing the ends of the hoops together and for thereby tightening the hoops about the tank. Ordinarily, each hoop will include two or more of such fasteners or tighteners.

The coupling member 14, constituting part of the fastener, is of oblong rectangular shape, and comprises side members 15, 15 and end members 16. The side members, as herein shown, lie generally parallel to each other and are preferably curved slightly to conform to the curvature of the tank wall. The ends of the side members of the coupling loop are inclined outwardly or away from the tank wall, as shown at 17 so as to space the end members 16 away from the wall at such distance as to receive the hoop ends, between the ends of the loop and the wall, as best shown in Fig. 3, and thereby permit the side members of the coupling loop to lie flat against the tank wall. The end members of the coupling loop are centrally offset as shown at 18, they being herein shown as offset outwardly or away from the wall. The purpose of so offsetting the end members of the coupling loop is to permit the ends of the hoops, which cross the said end members, to lie at their points of crossing substantially in the planes of the straight parts of the end members for proper coaction with fitting or blocks 20, 21 which lie inside of said end members and through which the hoop ends extend. The hoop ends are screw-threaded to receive nuts 22, 22. One of these nuts bears against its coacting fitting 21, while the other bears against the adjacent end of a spiral spring 23 which surrounds the portion of the hoop end that extends beyond the fitting 20, said spring being confined between said latter fitting and the associated nut 22. The presence of this spring enables the hoop to automatically adjust itself to the wall of the tank, regardless of whether the tank be contracted or expanded. This feature of the device is especially useful when employed with silo tanks, inasmuch as such tanks are subject to considerable variation of diameter, due to contraction and expansion. For instance, when the wet silage is placed in the tank its moisture expands the staves of the tank wall and increases the diameter of the tank. When the tank is empty the staves of the tank wall contract. Moreover, the tank wall may be subject to more or less variation of diameter under contraction and expansion due to varying climatic conditions. If such springs be not employed it is necessary to tighten or loosen the nuts 22 when the conditions referred to are indicated. If the hoops are not loosened when the tank expands too great a stress is placed thereon. If they are not tightened when the staves contract, the tank is liable to collapse. The springs automatically take care of these conditions.

The blocks 20, 21 are provided at their outer ends with laterally separate lugs 24, 24, which bear against the straight portions of the end members of the coupling loop at the sides of the offset portions 18 thereof. The said projections are preferably provided with concave recesses or notches 25 to fit over the said end members of the coupling loop. The engagement of the notched portions of the blocks laterally at the sides of the end portions of the coupling loop permits the blocks to swing or pivot about said end members so as to avoid all tendency of the hoop ends to bind against the walls of the openings in the blocks in a manner to prevent free slipping of said ends in said openings when tightening the hoop or when the hoop is automatically adjusted to the tank by the springs 23.

In order to bring the ends of the hoops as close to the tank wall as practicable, I preferably cut away the inner sides of the fittings 20, 21 as shown at 27 in Fig. 6, whereby the openings 28 of said fittings are closer to the inner than the outer sides of the said fittings. The inner, thinner walls of said hollow fittings are preferably tapered as shown in Figs. 3 and 6 so as to thereby dispose the openings in said fittings and the ends of the hoop tangentially to the circumference of the tank. Thus the ends of the hoop, especially the elongated end which receives the spring 23, extends laterally from the loop 12 so that its nut may be readily engaged by a wrench.

As a further improvement, I prefer to make the opening in the fitting 20, or that associated with the spring 23, somewhat larger in diameter than that of the hoop end which passes therethrough, and to make the spring 23 of a diameter to fit fairly snugly upon the hoop end. I prefer also to provide the inner end of the fitting 20 with a socket to receive the outer end of the spring. This socket is concentric to the opening 28 of the fitting and may be formed by an outstanding flange or flanges 28', at the sides of the opening 28, as most clearly shown in Figs. 2 and 5.

An advantage of offsetting the end members of the coupling loop outwardly so that they lie outside of the hoop ends is that thereby the coupling members may be placed readily over the ends of the hoops after the spring and nuts have been applied and thereby facilitate the assembling of the parts.

In Fig. 8, I have shown a form of loop 32 which is made with flat side and end members 33, 34, respectively, in the form of an oblong rectangle. In this form, the end members are provided with internal recesses or sockets 35 and the fittings 36, 37, through which the hoop ends 11 extend, are provided with convexly formed faces to engage said sockets, in the manner of a ball and socket joint. In this instance the fitting 36, associated with the spring 23, is provided with a socket 39 to receive the outer end of said spring, and the inner end of the other fitting 37 is made flat for engagement with the adjacent nut 22.

While the coupling loops or members are herein shown as made considerably shorter than the hoop sections, it will be manifest that the advantages ascribed to the means for connecting the hoop sections and the coupling members will be present if the coupling members be made relatively longer or should constitute in themselves substantial parts of the tank encircling members.

I claim as my invention,—

1. The combination with a hoop adapted to surround a silo or like tank and having its ends arranged in line with each other, of a hoop fastener comprising an open coupling member, fittings within the member pivotally connected to the opposite ends thereof and provided with openings through which the hoop ends extend and means associated with the hoop ends and fittings to draw the hoop about the tank.

2. The combination with a hoop adapted to surround a silo or like tank and having its ends arranged in line with each other, of a hoop fastener comprising a coupling member, fittings pivotally connected to the opposite ends thereof and provided with openings through which the hoop ends extend, at least one of said ends being screw-threaded, with a nut thereon to act against the adjacent fitting to tighten the hoop, the opening in the said latter fitting being larger than the hoop end and means to centralize the hoop end therein, for the purpose set forth.

3. The combination with a hoop adapted to surround a silo or like tank and having its ends arranged in line with each other, of a hoop fastener comprising an open coupling member, fittings within said member pivotally connected to the opposite ends thereof and provided with openings through which the hoop ends extend, means to centralize the hoop ends in said fittings to avoid friction between the parts, one end of the hoop being screw-threaded to receive a nut, and a spring interposed between one of said fittings and said nut.

4. The combination with a hoop for a silo or like tank, of a hoop fastener comprising a coupling member, fittings pivotally connected thereto and provided with openings through which the hoop ends extend, one end of the hoop end being screw-threaded to receive a nut, and a spring interposed between one of said fittings and said nut, the opening in said latter fitting being made larger than the diameter of the hoop end, and said spring being constructed to serve as a guide for the hoop end to avoid binding engagement of the hoop end with the wall of said opening.

5. The combination with a hoop for a silo or like tank, of a hoop fastener comprising a coupling member, fittings pivotally connected thereto and provided with openings through which the hoop ends extend, nuts screw-threaded to the hoop ends and co-acting with the fittings, the opening in one of the fittings being of greater diameter than the hoop end which extends therethrough, and a spiral spring surrounding the latter hoop end between the associated fitting and nut, with one end thereof connected to said fitting said spring closely fitting the hoop end to serve as a guide for the latter end to hold the same out of contact with the wall of the opening in said fitting.

6. The combination with a hoop for a silo or like tank, of a hoop fastener comprising a coupling member, fittings pivotally connected thereto and provided with openings through which the hoop ends extend, nuts screw-threaded to the hoop ends and co-acting with the fittings, the opening in one of the fittings being of greater diameter than the hoop end which extends therethrough, and a spiral spring surrounding the latter hoop end between the associated fitting and nut, said spring closely fitting the hoop end to serve as a guide for the latter end to hold the same out of contact with the wall of the opening in said fitting, and said latter fitting being provided with a socket to receive one end of said spring to hold the same centrally with respect to the axis of said fitting opening.

7. The combination with a hoop for a silo or like tank, of a hoop fastener comprising a coupling member, fittings pivotally connected thereto and provided with openings through which the hoop ends extend, one end of the hoop being screw-threaded to receive a nut, and a spring interposed between one of said fittings and said nut, the opening in the fitting through which extends the hoop end associated with said spring being disposed tangentially to the circumference of the tank, and made larger than the hoop end, with means to maintain free passage of the hoop end through the fitting.

8. In a silo construction, the combination with the staved wall thereof and a surrounding, confining hoop including a coupling member to which the ends of the hoop are pivotally and slidably connected, yielding means associated with the coupling member and said hoop to maintain the hoop tight upon the silo wall, while permitting the wall to expand, and means for maintaining freedom of movement of the hoops ends relatively to the coupling member, whereby said loop is held subject always to the influence of said spring during the contractions and expansions of said tank wall.

In testimony, that I claim the foregoing as my invention I affix my signature in the presence of two witnesses, this 31st day of October A. D. 1912.

ANDREW RASMUSSEN.

Witnesses:
H. N. BACOM,
EBEN BURROUGHS.